United States Patent
Balva

(10) Patent No.: US 11,821,743 B2
(45) Date of Patent: Nov. 21, 2023

(54) DYNAMIC PROMOTIONS BASED ON VEHICLE POSITIONING AND ROUTE DETERMINATIONS

(71) Applicant: Ford Global Technologies, LLC, Dearborn, MI (US)

(72) Inventor: Alexander Balva, Palo Alto, CA (US)

( * ) Notice: Subject to any disclaimer, the term of this patent is extended or adjusted under 35 U.S.C. 154(b) by 596 days.

(21) Appl. No.: 17/048,017

(22) PCT Filed: Apr. 18, 2018

(86) PCT No.: PCT/US2018/028126
§ 371 (c)(1),
(2) Date: Oct. 15, 2020

(87) PCT Pub. No.: WO2019/203818
PCT Pub. Date: Oct. 24, 2019

(65) Prior Publication Data
US 2021/0172751 A1  Jun. 10, 2021

(51) Int. Cl.
*G01C 21/34* (2006.01)
*G01C 21/36* (2006.01)
(Continued)

(52) U.S. Cl.
CPC ..... *G01C 21/3476* (2013.01); *G01C 21/3415* (2013.01); *G01C 21/3682* (2013.01);
(Continued)

(58) Field of Classification Search
CPC ............ G01C 21/3476; G01C 21/3415; G01C 21/3682; G06N 20/00; G06Q 10/047;
(Continued)

(56) References Cited

U.S. PATENT DOCUMENTS 9,715,233 B1 * 7/2017 Mandeville-Clarke ...................... G01C 21/362
9,726,510 B2   8/2017 Peri et al.
(Continued)

FOREIGN PATENT DOCUMENTS

| WO | WO-2010126450 A2 * | 11/2010 | ........... G08G 1/0962 |
| WO | WO-2013163333 A2 * | 10/2013 | ......... G06Q 30/0261 |
| WO | WO-2018126285 A1 * | 7/2018 | ............. G06F 16/29 |

*Primary Examiner* — Calvin Cheung
(74) *Attorney, Agent, or Firm* — Brandon Hicks; Eversheds Sutherland (US) LLP

(57) ABSTRACT

Embodiments of the present disclosure provide improved techniques of a route optimization system to provide dynamic promotions to compensate for predicted time of arrival of a vehicle in response to a ride request. The promotions may be for vendors located by the pickup location in the ride request and timed to compensate for a wait time or an unexpected delay. In another embodiment, dynamic promotions may be determined and provided to incentivize customers to go to an alternate pickup location providing a more optimized route for the assigned vehicle. The more optimized route may be based on a better quality route score compared to the quality route score of the route originally determined for the original pickup location from the ride request. The promotion may be for vendors identified to be on the way to the alternate pickup location and timed to optimize efficiency and reduce any lag or wait time on the customer's behalf.

18 Claims, 7 Drawing Sheets

(51) Int. Cl.
*G06Q 10/047* (2023.01)
*G06Q 30/0207* (2023.01)
*G06Q 30/0235* (2023.01)
*G06Q 50/30* (2012.01)

(52) U.S. Cl.
CPC ....... *G06Q 10/047* (2013.01); *G06Q 30/0224* (2013.01); *G06Q 30/0235* (2013.01); *G06Q 50/30* (2013.01)

(58) Field of Classification Search
CPC .......... G06Q 30/0224; G06Q 30/0235; G06Q 50/30; G06Q 10/02; G06F 3/0482; G06F 3/0488
See application file for complete search history.

(56) References Cited

U.S. PATENT DOCUMENTS

| | | | | |
|---|---|---|---|---|
| 10,956,855 | B1* | 3/2021 | Coughran | G06Q 10/047 |
| 11,378,413 | B1* | 7/2022 | Rao | G01C 21/3605 |
| 2002/0173978 | A1* | 11/2002 | Boies | G06Q 10/025 |
| | | | | 705/5 |
| 2009/0150156 | A1* | 6/2009 | Kennewick | G01C 21/3608 |
| | | | | 704/275 |
| 2010/0312586 | A1* | 12/2010 | Drefs | G06Q 10/02 |
| | | | | 705/14.27 |
| 2012/0203628 | A1* | 8/2012 | DeCaro | G06Q 30/0252 |
| | | | | 705/14.49 |
| 2014/0357261 | A1* | 12/2014 | Chiu | H04W 4/021 |
| | | | | 455/552.1 |
| 2015/0026713 | A1* | 1/2015 | Jain | H04N 21/258 |
| | | | | 725/23 |
| 2015/0276419 | A1* | 10/2015 | Hashem | G01C 21/20 |
| | | | | 701/425 |
| 2016/0009304 | A1 | 1/2016 | Kumar et al. | |
| 2016/0171440 | A1 | 6/2016 | Durai et al. | |
| 2016/0209220 | A1* | 7/2016 | Laetz | G06Q 10/047 |
| 2016/0300163 | A1* | 10/2016 | Joea | G06Q 50/30 |
| 2017/0046736 | A1* | 2/2017 | Elmachtoub | G06Q 30/0255 |
| 2017/0053531 | A1* | 2/2017 | Ullrich | G08G 1/133 |
| 2017/0067750 | A1* | 3/2017 | Day | G08G 1/096716 |
| 2017/0192437 | A1* | 7/2017 | Bier | G05D 1/0077 |
| 2017/0193826 | A1* | 7/2017 | Marueli | G06Q 10/06311 |
| 2017/0220966 | A1* | 8/2017 | Wang | G06Q 20/322 |
| 2017/0316359 | A1* | 11/2017 | Amin | G06Q 30/0201 |
| 2018/0051997 | A1* | 2/2018 | Grochocki, Jr. | G01C 21/3415 |
| 2018/0189669 | A1* | 7/2018 | Jeon | G06N 20/00 |
| 2018/0211541 | A1* | 7/2018 | Rakah | G08G 1/148 |
| 2019/0033084 | A1* | 1/2019 | Chen | G06Q 10/047 |

* cited by examiner

DYNAMIC PROMOTIONS BASED ON VEHICLE POSITIONING AND ROUTE DETERMINATIONS

BACKGROUND

People are increasingly turning to offerings such as ridesharing to accomplish everyday tasks. Ridesharing can involve riders being allocated vehicles that are dedicated to those riders for a period of time, or being allocated seats on vehicles that will have other passengers riding at the same time. While individually allocated cars can have some benefits, sharing vehicles can reduce cost and provide some certainty as to scheduling. In order to ensure profitability of such a service, it is often desirable to attempt to minimize cost, as well as to increase utilization of the vehicles. When determining a vehicle to assign for a particular ride or route, conventional approaches look to the vehicles that are available at that time. Such an approach can be less than optimal, however, as the available vehicles may be a significant distance away, which increases the cost of providing that particular ride or route due to the extra costs of getting the vehicle to the origination location. Further, this extra distance can delay the start time of the ride, which not only impacts the user experience but also decreases the utilization of that vehicle since it is not occupied for a ride during the time of transfer to the origin of the next route.

BRIEF DESCRIPTION OF THE DRAWINGS

Various embodiments in accordance with the present disclosure will be described with reference to the drawings, in which.

DETAILED DESCRIPTION

Figure 1:
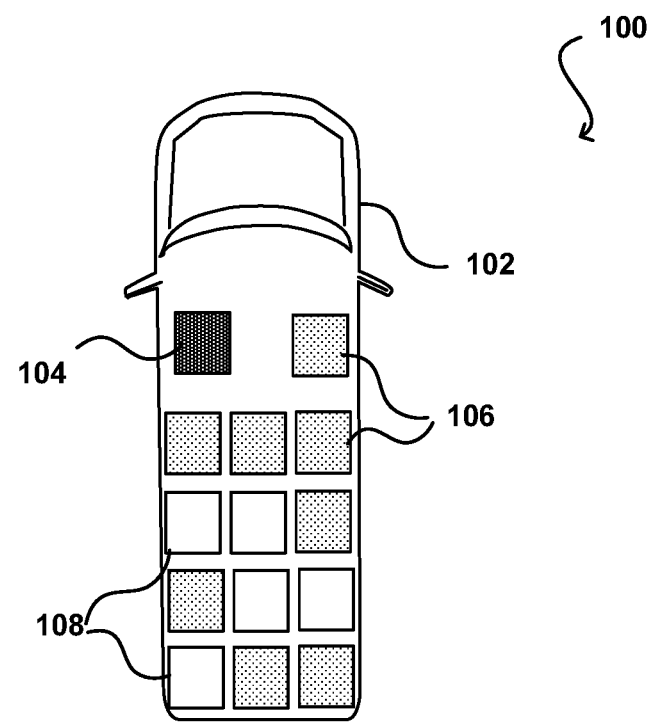
FIG. 1 illustrates an example ride request environment in which various embodiments can be implemented.
Figure 1:
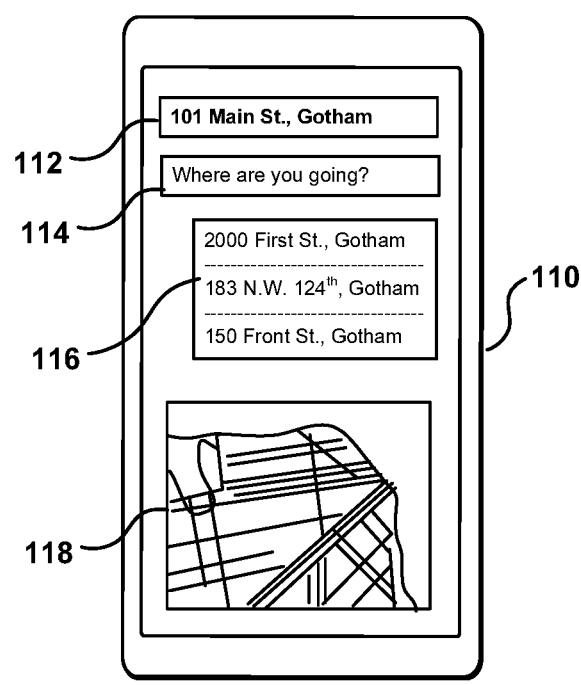

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the providing of transportation in response to various requests. In particular, various embodiments provide approaches for determining and selecting various promotions and routing solutions to serve a set of transportation requests. The requests can relate to the transportation of people, animals, packages, or other objects or passengers, from an origination location to a destination location. The requests may also include at least one time component. A provider, such as a transportation service, can utilize an objective function to balance various metrics when selecting between proposed routing solutions to serve a set of customer trip requests. An objective function can provide a compromise between, for example, rider experience and provider economics, taking into account metrics such as rider convenience, operational efficiency, and the ability to deliver on confirmed trips. The analysis can consider not only planned trips, or trips currently being planned, but also trips currently in progress. One or more optimization processes can be applied, which can vary the component values or weightings of the objective function in order to attempt to improve the quality score generated for each proposed routing solution. A solution can be selected for implementation based at least in part upon the resulting quality scores of the proposed routing solutions.

In addition to optimizing the routing for various requests, approaches in accordance with various embodiments can also perform proactive solutions to compensate for predicted delays or wait times in response to a particular ride request. For example, there may be an expected delay or intention or necessary adjustment that negatively impacts the quality of service of a particular ride. This can include, for example, needing to make an additional stop, needing to obtain a different vehicle, a delay due to a driver change, etc. In some instances, this may also include the need to move a rider to a different vehicle or route due to an overbooking or other such issue. Approaches in accordance with various embodiments can proactively determine an appropriate compensation for the degradation in service that is likely to be acceptable to the impacted rider(s). The types of compensation may differ between riders in some embodiments. This provides options other than incurring an unreasonable cost or inconveniencing multiple riders, as the service provider or operator may cancel the ride or provide it with a significant delay, but proactively issue compensation to account for the change. There may be unexpected occurrences as well, such as an accident, detour, or other event, that may cause an unexpected delay in the previously determined route and time of arrival. The provider may then dynamically determine a promotion solution in response to a particular ride request experiencing the delay, such as a voucher for coffee at a nearby coffee shop to compensate for the delay. The amount of compensation for an unexpected delay, or delay due to a factor other than the provider, may be less than the compensation provided for an expected or intentional degradation in service. As discussed herein, the appropriate type and amount of compensation may then be determined not only for the specific rider being compensated, but also for the type of degradation in service or inconvenience experienced. In at least some embodiments, the ability to offer compensation for adjustments in offerings expands the routing optimization solution space, as the available options can become more flexible at least where riders are open to such compensation options. Where available, a dynamic promotion can be provided utilizing offerings from vendors within close proximity of the requestor, such that the provider can reduce overall inefficiencies of the ridesharing and routing system, improve its optimization processes based on data and preferences of its user base gathered by responses to the promotions provided, and increase productivity. Promotions in such an approach can be targeted both at supply and at demand.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example, a user can request transportation from an origination to a destination location using, for example, an application executing on a client computing device 110. Various other approaches for submitting requests, such as by messaging or telephonic mechanisms, can be used as well within the scope of the various embodiments. Further, at least some of the requests can be received from, or on behalf of, an object being transported or scheduled to be transported. For example, a client device might be used to submit an initial request for an object, package, or other deliverable, and then subsequent requests might be received from the object, for example, or a device or mechanism associated with the device. Other communications can be used in place of requests, as may relate to instructions, calls, commands, and other data transmissions. For various embodiments discussed herein a "client device" should not narrowly be construed as a conventional computing device unless otherwise stated, and any device or component capable of receiving, transmitting, or processing data and communications can function as a client device in accordance with various embodiments.

The transportation can be provided using a vehicle 100 (or other object) capable of concurrently transporting one or more riders. While riders as used herein will often refer to human passengers, it should be understood that a "rider" in various embodiments can also refer to a non-human rider or passenger, as may include an animal or an inanimate object, such as a package for delivery. In this example, a rideshare service offers routes using at least one type of vehicle that includes space for a driver 102 and seats or other capacity for up to a maximum number of riders. It should be understood that various types of vehicles can be used with different numbers or configurations of capacity, and that autonomous vehicles without dedicated drivers can be utilized as well within the scope of the various embodiments. Vehicles such as smart bicycles or personal transport vehicles may be used as well, which may include seating capacity for only a single rider or limited number of passengers. For a given vehicle on a given route, a number of available seats 106 (or other rider locations) may be occupied by riders, while another number of seats 108 may be unoccupied. In some embodiments objects such as packages or deliveries may also occupy available space for a ride as well. In order to improve the economics of the rides offered, it can be desirable in at least some embodiments to have the occupancy as close to full as possible during the entire length of the trip. Such a situation results in very few unsold seats, which improves operational efficiency. One way to achieve high occupancy might be to offer only fixed routes where all passengers board at a fixed origination location and off-board at a fixed destination location, with no passengers onboarding or off-boarding at intermediate locations.

In the present example, a given user can enter an origination location 112 and a destination location 114, either manually or from a set of suggested locations 116, among other such options, such as by selecting from a map 118 or other interface element. In other embodiments, source such as a machine learning algorithm or artificial intelligence system can select the appropriate locations based on relevant information, such as historical user activity, current location, and the like. Such a system can be trained using historical ride data, and can learn and improve over time using more recent ride and rider data, among other such options. A backend system, or other provider service, can take this information and attempt to match the request with a specific vehicle having capacity at the appropriate time. As known for such purposes, it can be desirable to select a vehicle that will be near the origination location at that time in order to minimize overhead such as fuel and driver costs. As mentioned, the capacity can include a seat for a human rider or sufficient available volume for a package or object to be transported, among other such measures of capacity.

Such an approach may not be optimal for all situations, however, as it may be difficult to get enough users or object providers to agree to be at a specific origination location at a specific time, or within a particular time window, which can lead to relatively low occupancy or capacity utilization, and thus low operational efficiency. Further, such an approach may result in fewer rides being provided, which may reduce overall revenue. Further, requiring multiple users to travel to a specific, fixed origination location may cause those users to utilize other means of transportation, as may involve taxis or dedicated rideshare vehicles that do not require the additional effort. Accordingly, it can be desirable in at least some embodiments to factor rider convenience into the selection of routes to be provided. What may be convenient for one rider, however, may not be convenient for other riders. For example, picking up one rider in front of his or her house might add an additional stop, and additional route distance, to an existing route that might not be acceptable to the riders already on, or assigned to, that route. Further, different riders may prefer to leave at different times from different locations, as well as to get to their destinations within a maximum allowable amount of time, such that the interests of the various riders are at least somewhat competing, against each other and those of the ride provider. It therefore can be desirable in at least some embodiments to balance the relative experience of the various riders with the economics of the rideshare service for specific rides, routes, or other transportation options. In some embodiments, based on rider preferences, the provider may suggest that a particular rider be picked up at an alternate location, and offer a promotion as an incentive for the rider to accept the alternate pickup location to increase the efficiency of the overall route. The provider may also provide dynamic promotions to a rider to compensate for when the rider is expected to experience an unexpected delay in response to his or her ride request. While such an approach will likely prevent a ride provider from maximizing profit per ride, there can be some middle ground that enables the service to be profitable while providing (at a minimum) satisfactory service to the various riders or users of the service. Such an approach can improve the rider experience and result in higher ridership levels, which can increase revenue and profit if managed appropriately.

Figure 2A:
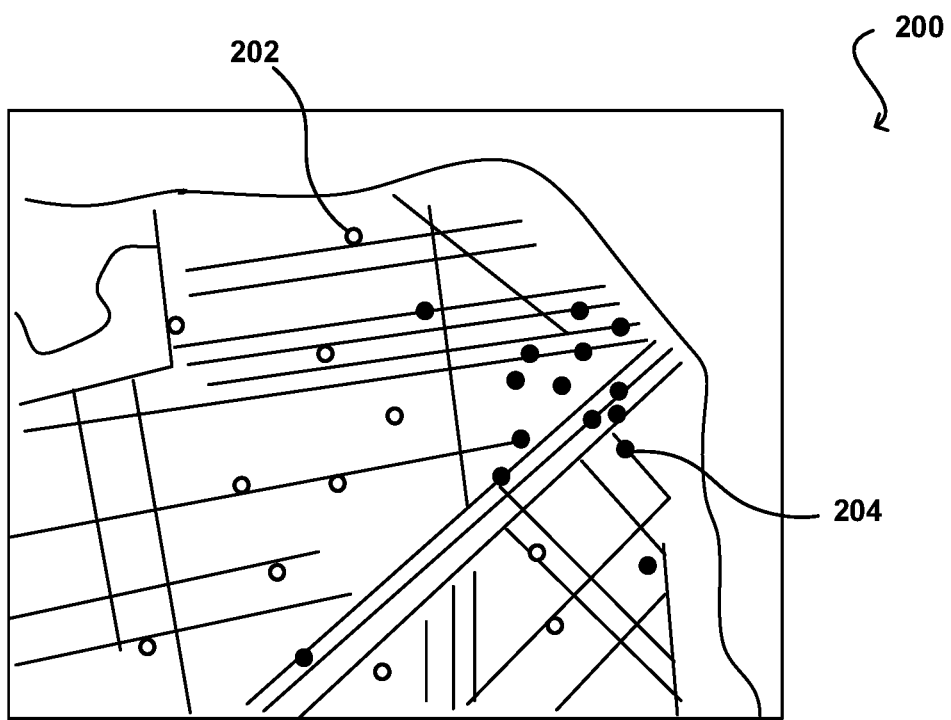
FIGS. 2A and 2B illustrate example origination and destination locations, and routes for serving those locations, that can be determined for a service area over a period of time in accordance with various embodiments.
Figure 2B:
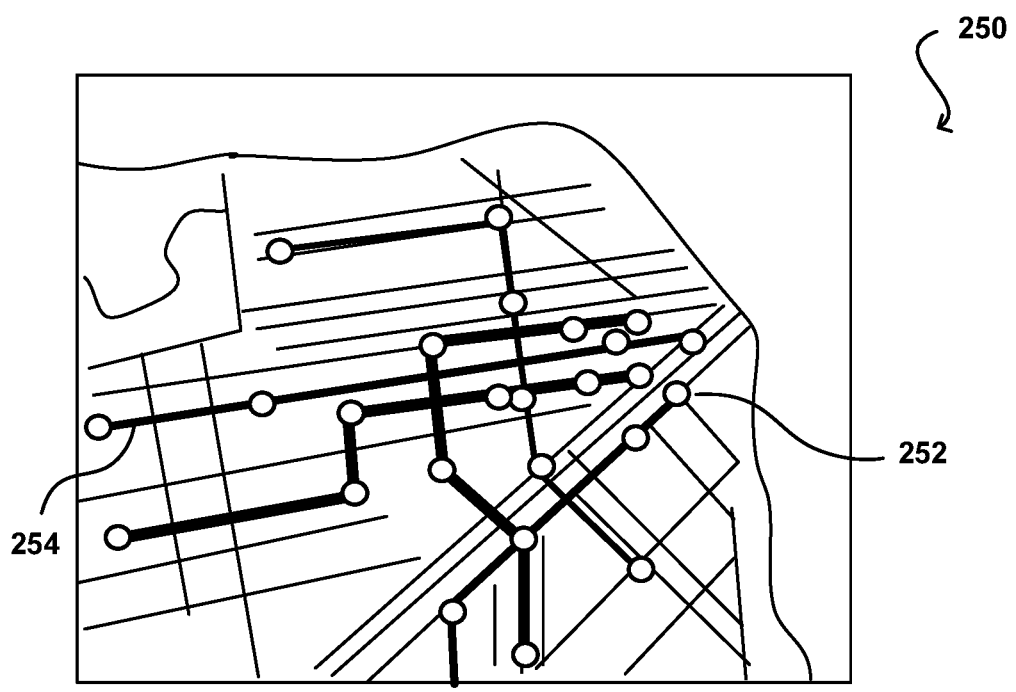

FIGS. 2A and 2B illustrate one example approach that can be utilized to provide such service in accordance with various embodiments. In the example mapping 200 of FIG. 2A, a set of origination points 202 and destination points 204 indicate locations, over a determined period of time, between which one or more users would like to travel. As illustrated, there are clusters of locations where users may want to be delivered, or objects are to be delivered, as may correspond to town centers, urban locations, or other regions where a number of different businesses or other destinations are located. The origin locations, however, may be less clustered, such as may relate to suburbs or rural areas where rider homes may be located. The clustering can also vary throughout the day, such as where people travel from their homes to their places of employment in the mornings, and generally travel in the reverse directions in the evening. There may be little clustering between these periods, or the clustering may be primarily to locations within an urban area. Particularly in urban areas, there may be a number of vendors, stores, retailers, and restaurants within close proximity to the origin locations. For example, riders requesting rides after work may have origin locations at his or her offices, which often have coffee shops or stores in the immediate surrounding areas. The provider may determine and log these vendors in order to provide dynamic promotions to riders to compensate for delays in routing and/or as an incentive for riders to adjust the origin location to facilitate an optimal overall route.

In the example route mapping of FIG. 2B, for an origination point 252 there may be a plurality of routes 254 determined based on the destination and/or other users and their destinations and originations identified to be assigned to a particular vehicle. In order to determine the routes to provide, as well as the vehicles (or types of vehicles) to use to provide those routes, various factors can be considered as discussed and suggested herein. A function of these factors can then be optimized in order to provide for an improved customer experience, or transport experience for transported objects, while also providing for improved profitability, or at least operational efficiency, with respect to other available routing options. The optimization approaches and route offerings can be updated over time based on other available data, as may relate to more recent ride data, ridership requests, traffic patterns, construction updates, and the like. In some embodiments an artificial intelligence-based approach, as may include machine learning or a trained neural network, for example, can be used to further optimize the function based upon various trends and relationships determined from the data as discussed elsewhere herein.

Approaches in accordance with various embodiments can utilize at least one objective function to determine route options for a set of vehicles, or other transportation mechanisms, for one or more regions of service or coverage. At least one optimization algorithm can be applied to adjust the various factors considered in order to improve a result of the objective function, such as to minimize or maximize the score for a set of route options. The optimization can apply not only to particular routes and vehicles, for example, but also to compensating for unexpected delays by providing promotions to improve rider experience and/or incentivize the rider to adjust the origin location as a result of the delay for optimized routing. An objective function can serve as an overall measure of quality of a routing solution, set of proposed routing options, or past routing selections. An objective function serves as a codification of a desire to balance various factors of importance, as may include the rider's convenience or experience, as well as the service delivery efficiency for a given area and the quality of service (QoS) compliance for specific trips, among other such options. For a number of given origination and destination locations over a given period of time, the objective function can be applied and each proposed routing solution given a score, such as an optimized route score, which can be used to select the optimal routing solution. In some embodiments the routing option with the highest route score will be selected, while in other embodiments there can be approaches to maximize or minimize the resulting score, or generate a ranking, among various other scoring, ranking, or selection criteria. Routing options with the lowest score may be selected as well in some embodiments, such as where the optimization function may be optimized based on a measure of cost, which may be desirable to be as low as possible, versus a factor such as a measure of benefit, which may be desirable to be as high as possible, among other such options. In other embodiments the option selected may not have the optimal objective score, but has an acceptable objective score while satisfying one or more other ride selection criteria, such as may relate to operational efficiency or minimum rider experience, among others. In one embodiment, an objective function accepts as inputs the rider's convenience, the ability to deliver confirmed trips, the fleet operational efficiency, and the current demand. In some embodiments, there will be weightings of each of these terms that may be learned over time, such as through machine learning. The factors or data making up each of these terms or value can also change or be updated over time.

As an example, a rider's convenience score can take into account various factors. One factor can be the distance from the rider's requested origination point to the origination point of the selected route. The scoring may be performed using any relevant approach, such as where an exact match is a score of 1.0 and any distance greater than a maximum or specified distance achieves a score of 0.0. The maximum distance may correspond to the maximum distance that a user is willing to walk or travel to an origination location, or the average maximum distance of all users, among other such options. For packages, this may include the distance that a provider is willing to travel to have those packages transported to their respective destinations. The function between these factors can vary as well, such as may utilize a linear or exponential function. For instance, in some embodiments an origination location halfway between the requested and proposed origination locations might be assigned a convenience score of 0.5, while in other approaches is might earn 0.3 or less. A similar approach may be taken for time, where the length of time between the requested and proposed pickups can be inversely proportional to the convenience score applied. Various other factors may be taken into account as well, as may include ride length, number of stops, destination time, anticipated traffic, and other such factors. The convenience value itself may be a weighted combination of these and other such factors. Depending on the convenience value to the rider balanced with the overall routing score, the provider may dynamically determine a promotion to incentivize the rider to an updated origin location. For example, if the convenience score is closer to 0.0 (i.e., least convenient to the user) within a determined threshold, the likelihood that the rider will be receptive to an updated origin location or accept the ride decreases. To combat the risk of the rider canceling or having a negative experience, the provider may offer a promotion, such as a free coffee at a coffee shop on the way to the updated origin location, to incentivize the rider.

Optimizing, or at least taking into consideration, a rider's convenience metric can help to ensure that trips offered to the riders are at least competitively convenient. While rider convenience may be subjective, the metric can look at objective metrics to determine whether the convenience is competitive with respect to other means of transportation available. Any appropriate factors can be considered that can be objectively determined or calculated using available data. These factors can include, for example, an ability (or inability) to provide various trip options. The factors can also include a difference in the departure or arrival time with respect to the time(s) requested by the riders for the route. In some embodiments a rider can provide a target time, while in others the riders can provide time windows or acceptable ranges, among other such options. Another factor can relate to the relative trip delay, either as expected or based upon historical data for similar routes. For example certain routes through certain high traffic locations may have variable arrival times, which can be factored into the convenience score for a potential route through that area or those locations. Another factor may relate to the walking (or non-route travel) required of the user for a given route. This can include, as mentioned, the distance between the requested origin and the proposed origin, as well as the distance between the requested destination and the proposed destination. Any walking required to transfer vehicles may also be considered if appropriate. The provider may determine and offer promotions to compensate for delays, for example, a free or discounted magazine or book at a nearby shop. In another example, the provider may determine a menu of promotions to various vendors along the walking route that the rider is scheduled to take. The rider may select whichever promotion is most attractive or relevant at that time, providing increased rider experience and satisfaction.

Another factor that may be considered with the rider convenience metric, but that may be more difficult to measure, is the desirability of a particular location. In some embodiments the score may be determined by an employee of the provider, while in other embodiments a score may be determined based on reviews or feedback of the various riders, among other such options. Various factors can be considered when evaluating the desirability of a location, as may relate to the type of terrain or traffic associated with a spot. For example, a flat location may get a higher score than a location on a steep hill. Further, the availability, proximity, and type of smart infrastructure can impact the score as well, as locations proximate or managed by smart infrastructure may be scored higher than areas locations without such proximity, as these areas can provide for more efficient and environmentally friendly transport options, among other such advantages. Similarly, a location with little foot traffic might get a higher score than near a busy intersection or street car tracks. In some embodiments a safety metric may be considered, as may be determined based upon data such as crime statistics, visibility, lighting, and customer reviews, among other such options. Various other factors may be considered as well, as may relate to proximity of train lines, retail shops, coffee shops, and the like, for which the provider may determine and offer promotions to the rider. These promotions serve to incentivize the rider to accept an alternate location that may be less convenient to the user but be more desirable overall for the provider in maintaining overall route score and efficiency.

Figure 3:
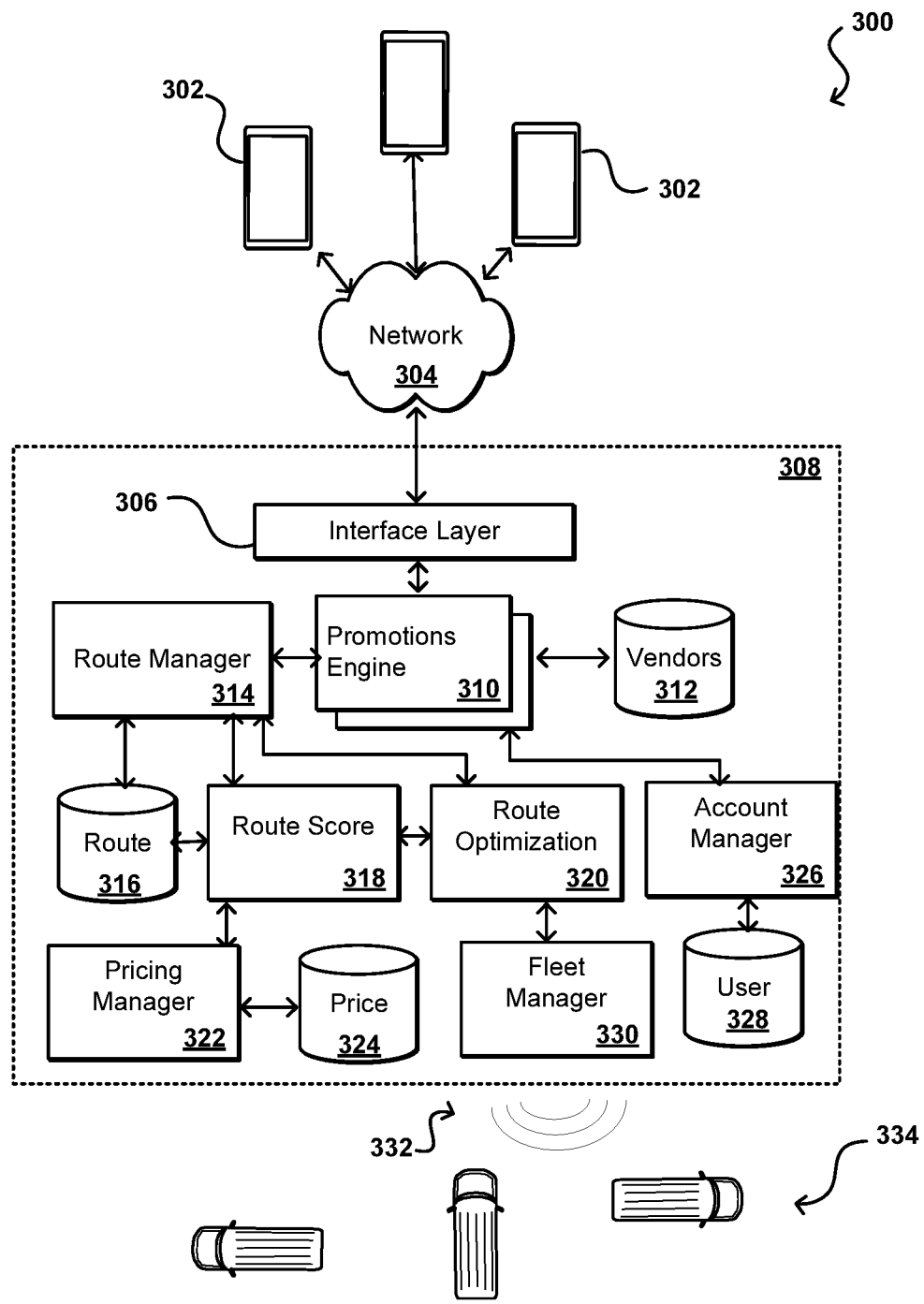
FIG. 3 illustrates an example system that can be utilized to implement aspects of the various embodiments.

As mentioned, a route optimization system in some embodiments can attempt to utilize such an objective function in order to determine and compare various routing options. FIG. 3 illustrates an example system 300 that can be utilized to determine and manage vehicle routing in accordance with various embodiments. In this system, various users can use applications executing on various types of computing devices 302 to submit route requests over at least one network 304 to be received by an interface layer 306 of a service provider environment 308. The computing devices can be any appropriate devices known or used for submitting electronic requests, as may include desktop computers, notebook computers, smartphones, tablet computers, and wearable computers, among other such options. The network(s) can include any appropriate network for transmitting the request, as may include any selection or combination of public and private networks using wired or wireless connections, such as the Internet, a cellular data connection, a WiFi connection, a local area network connection (LAN), and the like. The service provider environment can include any resources known or used for receiving and processing electronic requests, as may include various computer servers, data servers, and network infrastructure as discussed elsewhere herein. The interface layer can include interfaces (such as application programming interfaces), routers, load balancers, and other components useful for receiving and routing requests or other communications received to the service provider environment. The interfaces, and content to be displayed through those interfaces, can be provided using one or more content servers capable of serving content (such as web pages or map tiles) stored in a content repository or other such location.

Information for the request can be directed to a route manager 314, such as may include code executing on one or more computing resources, configured to manage aspects of routes to be provided using various vehicles of a vehicle pool or fleet associated with the transport service. The route manager can analyze information for the request, determine available planned routes from a route data store 316 that have capacity can match the criteria of the request, and can provide one or more options back to the corresponding device 302 for selection by the potential rider. The appropriate routes to suggest can be based upon various factors, such as proximity to the origination and destination locations of the request, availability within a determined time window, and the like. In some embodiments, an application on a client device 302 may instead present the available options from which a user can select, and the request can instead involve obtaining a seat for a specific planned route at a particular planned time.

As mentioned, however, in some embodiments users can either suggest route information or provide information that corresponds to a route that would be desired by the user. This can include, for example, an origination location, a destination location, a desired pickup time, and a desired drop-off time. Other values can be provided as well, as may relate to a maximum duration or trip length, maximum number of stops, allowable deviations, and the like. In some embodiments at least some of these values may have maximum or minimum values, or allowable ranges, specified by one or more route criteria. There can also be various rules or policies in place that dictate how these values are allowed to change with various circumstances or situations, such as for specific types of users or locations. The route manager 314 can receive several such requests, and can attempt to determine the best selection of routes to satisfy the various requests. In this example the route manager 314 can work with a score generation module 318 that calculates a route score for each route determined by the route manager 318 as a viable option in response to the ride requests. The score generation module 318 may calculate scores that factor in options with different numbers of vehicles, different vehicle selections or placements, and different options for getting the various customers to their approximate destinations at or near the desired times. It should be understood that in some embodiments customers may also request for specific locations and times where deviation is not permissible, and the route manager may need to either determine an acceptable routing option or deny that request if minimum criteria are not met. In some embodiments an option can be provided for each request, and a pricing manager 322 can determine the cost for a specific request using pricing data and guidelines from a price repository 324, which the user can then accept or reject.

In this example, the score generation module 318 may calculate route scores based on an objective function. In various embodiments the objective function is applied to each potential route in order to generate a route "quality" score, or other such value. The values of the various options can then be analyzed to determine the routing options to select. In one embodiment, the route optimization module 320 applies the objective function to determine the route quality scores and then can select the set of options that provides the highest overall, or highest average, total quality score. Various other approaches can be used as well as would be understood to one of ordinary skill in the art in light of the teachings and suggestions contained herein. The score generation module 318 may communicate with a route optimization module 320, which can perform an optimization process using the provided routing options to determine an appropriate set of routes to provide in response to the various requests. In some embodiments, the route optimization 320 may determine a more optimal route from an alternate origination location to the destination location where the alternate route has a better route score calculated by the score generation 318.

Optimization algorithms may evolve automatically over time, as may be done using random experimentation or based on various heuristics. As these algorithms evolve, the value of the objective function can serve as a measure of fitness or value of a new generation of algorithms. Algorithms can change over time as the service areas and ridership demands change, as well as to improve given the same or similar conditions. Such an approach may also be used to anticipate future changes and their impact on the service, as well as how the various factors will change. This can help to determine the need to add more vehicles, reposition parking locations, etc. In some embodiments artificial intelligence-inclusive approaches, such as those that utilize machine learning, can be used with the optimization algorithms to further improve the performance over time. For example, the raising and lowering of various factors may result in a change in ridership levels, customer reviews, and the like, as well as actual costs and timing, for example, which can be fed back into a machine learning algorithm to learn the appropriate weightings, values, ranges, or factors to be used with an optimization function. In some embodiments the optimization function itself may be produced by a machine learning process that takes into account the various factors and historical information to generate an appropriate function and evolve that function over time based upon more recent result and feedback data, as the machine learning model is further trained and able to develop and recognize new relationships.

The service provider environment 308 may also include a promotions engine 310 that accesses a vendor database 312, where vendors may be selected based on the origination location in the request. The promotions may be generated based on the routes selected from the route manager 314, and in some embodiments, may factor in the scores of the route from the score generation module 318. For example, the set of routes generated by the route manager 314 for a specific request having an origination location and destination location may not have route score above a minimum threshold. Alternatively, the route optimization 320 may determine more optimal routes from an alternate origination location with higher route scores. To incentivize the customer to accept the alternate origination location to satisfy a route score threshold for a more optimized route, the promotions engine 310 may generate promotions for vendors identified within close proximity or on the way to the alternate origination location. In another embodiment, a fleet manager 330 may be tracking 332 the fleet of vehicles and/or a specific assigned vehicle 334 to the route and determine that there is a delay in the route. To compensate for the delay in the arrival to the origination location of the customer, the promotions engine 310 may provide a promotion for a vendor that is close to the user's origination location. The promotions engine 310 may communicate with an account manage 326 with access to a user database 328 to personalize the promotions provided to the customer, for example the promotions may be customized based on personal preferences, historical data of the customer, age, gender, geographical location, and/or other demographic data associated with the customer.

As discussed elsewhere herein, there may be various types of promotions or compensation available from which a promotions engine, or other such system or service, can select. The options can each have an attached monetary value, desirability factor, or other value measure attached that can be used to determine appropriate compensation for a given situation. Similarly, there may be factors or aspects of the data that can be used to select promotions or compensation for various riders or entities, as may be based on historical or preference data, among other such options. In some embodiments, the promotions can be targeted at the mobility provider supply, while in other situations the promotions can be targeted at the riders of the mobility provider service. For example, promotions targeted at riders can be directly related to mobility, such as to offer a free ride to compensate for an unacceptable or poor experience on a taken ride. The promotions targeted at riders may also be indirectly related to mobility, such as to allow the rider to be taken closer to a specified coffee shop independent of the impact on the calculated quality of service for the ride. Other promotions can be provided as well, as may include traditional in-app or in-vehicle location-based marketing, or location-independent marketing. Various other types of promotions can be provided as well, such as promotions that attempt to entertain the user or enable the user to "kill time" during the ride, or while waiting for pickup or a connect, etc. These can include, for example, games, puzzled, videos, or podcasts available through the provider app or another such source. Other offerings may be less directly promotion based, but may ask questions about interests of the user or whether the user has impressions of certain local businesses, which can entertain the user while enabling future promotions or offerings to be potentially of more interest to the rider. Various other promotions and types of compensation can be offered as well would be apparent to one of ordinary skill in the art in light of the present disclosure.

Figure 4:
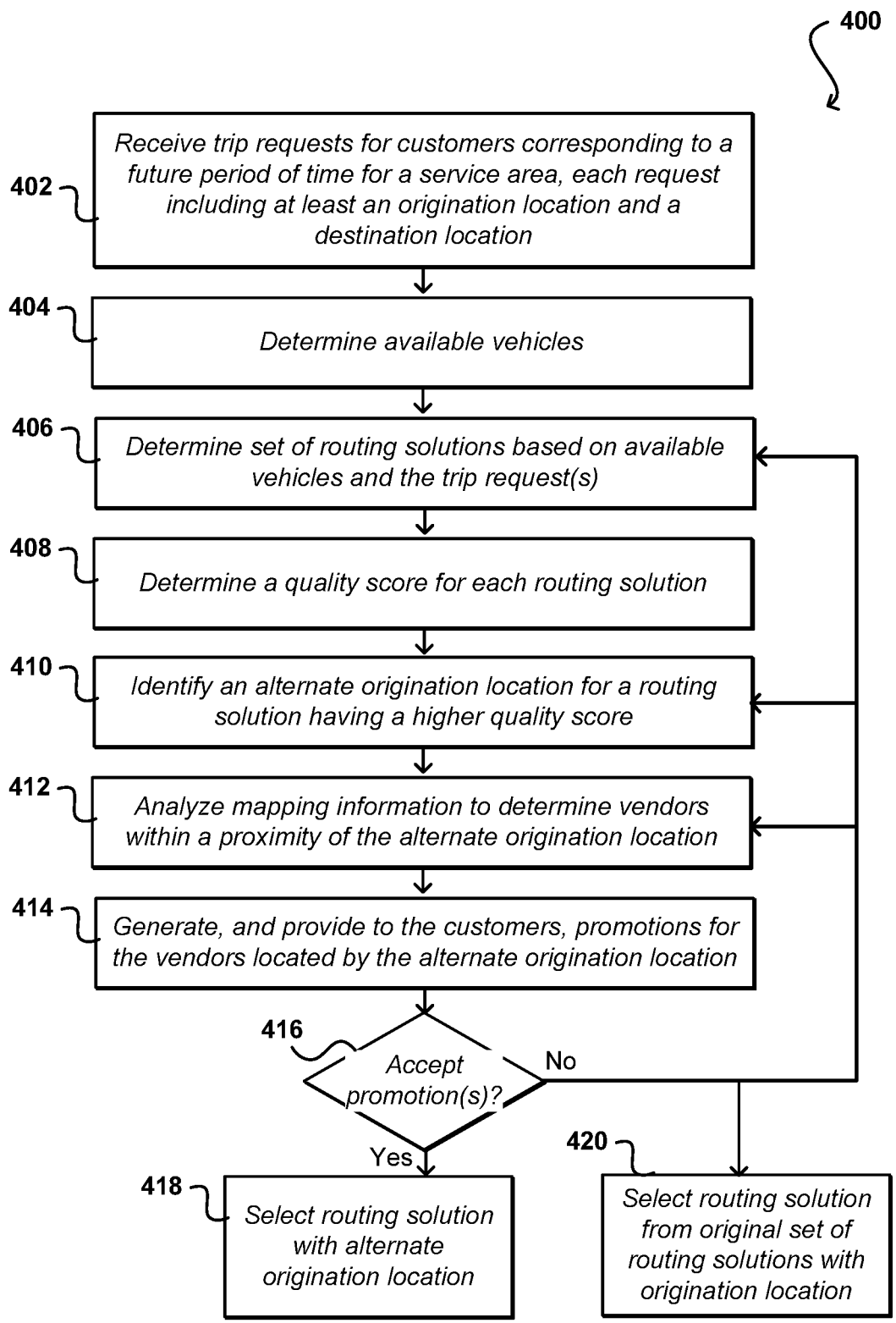
FIG. 4 illustrates an example process for determining dynamic promotions for an optimized routing solution for a set of trip requests that can be utilized in accordance with various embodiments.

FIG. 4 illustrates an example process 400 for determining dynamic promotions for an optimized routing solution for a set of trip requests that can be utilized in accordance with various embodiments. In this example process 400, the route optimization system may receive trip requests from customers' computing devices. The trip request may correspond to a future period of time for a geographical service area and include at least an origination location and a destination location. In some embodiments, the trip request may also include other parameters, such as the customers' preferences or time limitations, for example. In response to the trip requests, available vehicles may be determined 404 and a set of routing solutions may be determined 406 based on the available vehicles and the information from the trip requests. For each route in the set of routing solutions, a route score may be calculated 408. Based on the route scores of the routes in the routing solutions, an alternate origination solution may be identified as having a better route score 410. To incentivize the customer to travel to the alternate origination location, the route system may provide a promotion. In order to provide a relevant promotion, mapping information may be analyzed 412 to determine vendors within a determined proximity of the alternate origination location. The analysis may also account for operating hours of the vendors, the goods and services provided and whether it is relevant to the customer. Promotions for the determined vendors may be generated and provided to the customers 414. As described elsewhere herein, the promotions may be determined also based on customer preferences, historical routes or promotions accepted by the customer. Additionally, the promotion may be determined based on how much time it is estimated for the customer to complete the promotion transaction and travel to the alternate location. For example, the promotion may be for a vendor that is on the way to alternate origination location, and factoring in the time it takes the customer to complete the transaction may still result in a higher route score because the assigned vehicle can now pick up the customer at the alternate origination location.

The promotions for various determined vendors may be provided to the customer for selection 414. The promotions may be displayed on a computing device of the customer for selection, for example as a menu of promotions presented on the customer's mobile phone. The promotions may include an offer for a discount or a free item at a specific vendor, and may provide the location so that the customer can decide whether she wants to accept the promotion or not. The menu of promotions may give the customer the option to look for promotions with other vendors near the origination location or an alternate origination location, provided that the route optimization system has determined that the corresponding route score will still be above a minimum threshold so as to not compromise the quality of service provided to the customer. If the customer does not accept any of the promotion(s) 416, the route optimization system may return to determining another set of routing solutions with better route scores 406, identifying other alternate origination locations 410, and/or determine other vendors to provide promotions for 412. Alternatively, the customer may maintain the original route with the origination location and the assigned vehicle will pick up the customer at the original origination location 420. If the customer accepts one of the promotions 416, then the route with the alternate origination location is selected 418 for the assigned vehicle to proceed upon.

Figure 5:
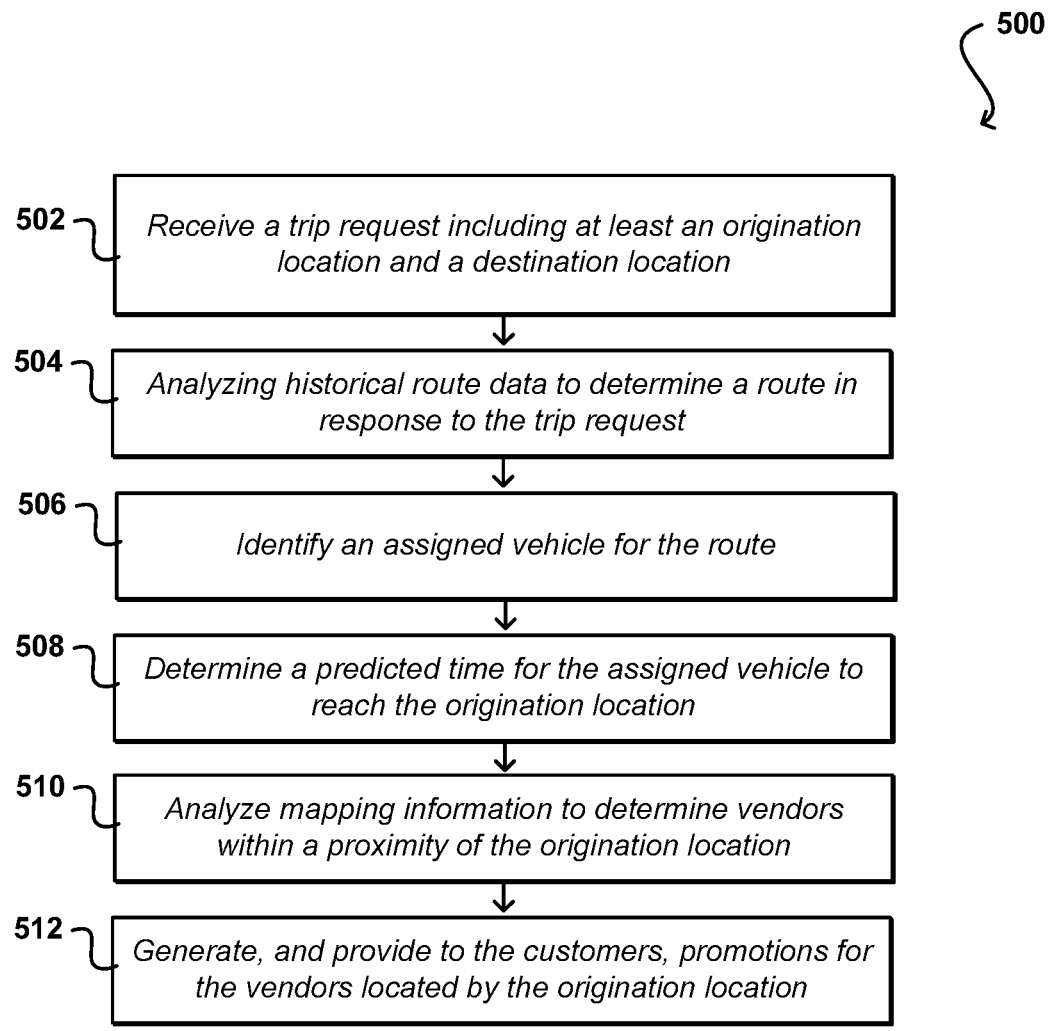
FIG. 5 illustrates an example process for determining dynamic promotions during a predicted time period for proposed routing solutions that can be utilized in accordance with various embodiments.

FIG. 5 illustrates an example process 500 for determining dynamic promotions during a predicted time period for proposed routing solutions that can be utilized in accordance with various embodiments. In another embodiment, the route system may receive a trip request 502 that includes at least an origination location and a destination location. The trip request may include other parameters set by the requestor, such as a type of vehicle needed or a number of passengers. Historical route data may be analyzed 504 to determine at least one route in response to the trip request to transport the requestor from the origination location to the destination location. As discussed elsewhere herein, the route determined may be based on a route score that includes an algorithm weighting various factors, including but not limited to, prior route information (e.g., average time to complete that route), customer preferences, origination location, destination location, other customers, traffic conditions (e.g., including historical and current tracking of traffic), convenience to the customer, fleet availability, etc. The route optimization system may identify a set of potential routes and select a route that has the best route score, or select routes that have a route score above a minimum threshold.

An assigned vehicle may be identified for the determined route 506. In some embodiments, a vehicle may be identified first before the route is determined, for example the vehicle may be selected based of its proximity to the origination location in the trip request. Subsequently, a predicted time for the assigned vehicle to arrive to the origination location is determined 508. Additionally, the vehicle may be identified based on driver ratings, the passenger and/or cargo capacity of the vehicle, etc. Mapping information may be analyzed 510 to determine vendors within a determined proximity of the origination location, factoring in the amount of time predicted for the assigned vehicle to arrive to the origination location. For example, within 100 feet of the origination location, or within 3 minutes walking distance, depending on the predicted time for arrival of the vehicle. The system may then generate, and provide to the customers, promotions for the vendors located by the origination location 512. The promotions may be customized based on the customer's preferences, historical data, predicted time, and/or geographical location. For example, if the predicted time is only two minutes, then the promotion may be for a coffee or other transaction that can be completed quickly. However, if the predicted time is ten minutes, then the promotion may be for a magazine the customer can read while waiting or a coupon for a clothing store that the customer can peruse while waiting for the assigned vehicle to arrive. The promotions may be transmitted to the customer's computing device for display and selection, such that the customer may scroll through a menu of promotions and respective vendors.

Figure 6:
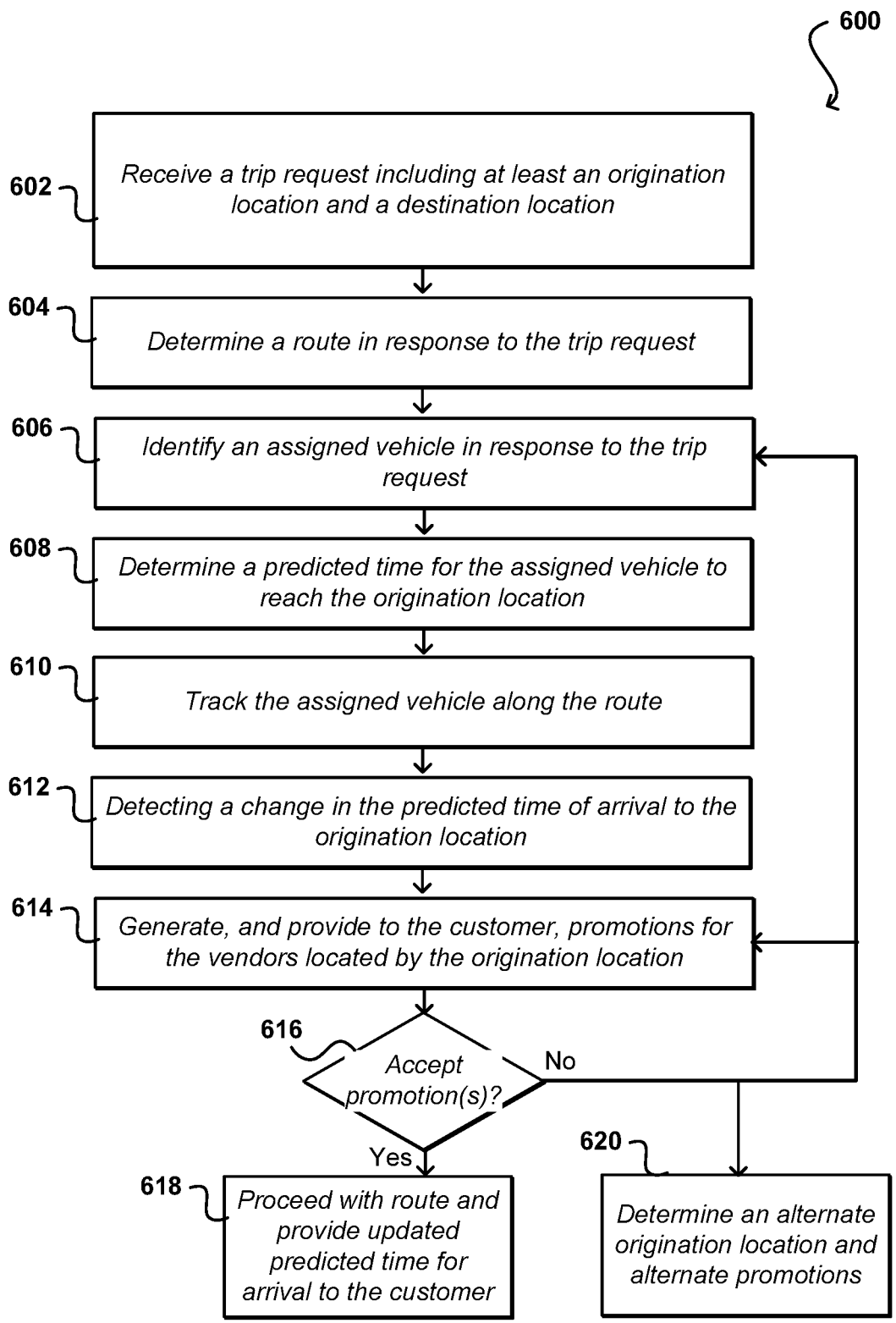
FIG. 6 illustrates an example process for determining dynamic promotions when a delay is detected for proposed routing solutions that can be utilized in accordance with various embodiments.

FIG. 6 illustrates an example process 600 for determining dynamic promotions when a delay is detected for proposed routing solutions that can be utilized in accordance with various embodiments. In this example process, one or more customers may transmit a trip request to the route optimization system 602. Each trip request may include at least an origination location and a destination location. The trip request may additionally include other parameters set by the customer and/or other information, for example, geographical area, number of passengers, demographic information of the customer, etc. A route may then be determined in response to the trip request 604, which may be based at least in part upon historical information of the customer, such as previous trip request, preferences, and/or settings. The route identified may be selected from a set of routes that the route optimization system determines based on historical routes from that origination location or similar locations, historical routes to the destination location or similar locations, historical routes taken by the customer, historical traffic conditions, present traffic conditions, etc. As discussed elsewhere herein, the identified route may be identified based on a route score, for example having the highest route score from the set of routes or having a route score above a minimum threshold. The route score may be calculated using an algorithm weighting various factors, including but not limited to quality of service, historical routes, historical times to complete the routes, customer convenience, desirability of the origination and/or destination location, fleet availability, etc.

An assigned vehicle may then be identified to complete the determined route in response to the trip request 606. The assigned vehicle may be identified based at least on driver rating, location of the driver, fleet availability, proximity to the origination location, current vehicle capacity, and/or the determined route. Alternatively, in another embodiment, the assigned vehicle may be identified prior to determining the route. For example, a vehicle may be identified as traveling in the direction towards the origination location from the trip request and thus identified as the assigned vehicle. Depending on the travel trajectory of the assigned vehicle, the route may be determined to minimize the number of turns or backtracking the assigned vehicle needs to do, improving overall efficiency, productivity, and customer convenience/experience. When the route and assigned vehicle are determined, the vehicle's predicted time of arrival to the origination location may be calculated 608. The predicted time may be provided to the customer. The route optimization system may track the assigned vehicle long the route 610, which may also be displayed to the customer on the customer's computing device. Upon detecting a change in the predicted time of arrival 612, the route optimization system may generate and provide promotions for vendors located by the origination location 614. A change in the predicted time of arrival may include unexpected delays due to misdirection by the driver, traffic conditions, detours, weather conditions, etc. Depending on the cause of the delay, the route optimization system may use the data to update its optimization and selection of routes, as well as its calculus for determining predicted times.

Promotions may be provided to the customer for display on the customer's computing device, for example as a selectable menu. The promotions may include an offer for a discount or a free item at a specific vendor, and may provide the location so that the customer can decide whether she wants to accept the promotion or not. In order to provide a relevant promotion, mapping information may be analyzed to determine vendors within a determined proximity of the alternate origination location. The analysis may also account for operating hours of the vendors, the goods and services provided and whether it is relevant to the customer. The menu of promotions may give the customer the option to look for promotions with other vendors near the origination location or an alternate origination location, provided that the route optimization system has determined that the promotion transaction will not cause further delay but compensate for the change in the predicted time of arrival. If the customer does not accept any of the promotion(s) 616, the route optimization system may return to determining another route 604 or assigned vehicle 606, and/or generating promotions 614. Alternatively, the route optimization system may determine an alternate origination location with alternate promotions for alternate vendors 620. If the customer accepts one of the promotions 616, then the assigned vehicle may proceed with the route determined 618 with the updated predicted time for arrival to coincide with the time it takes for the customer to complete the selected promotion.

Figure 7:
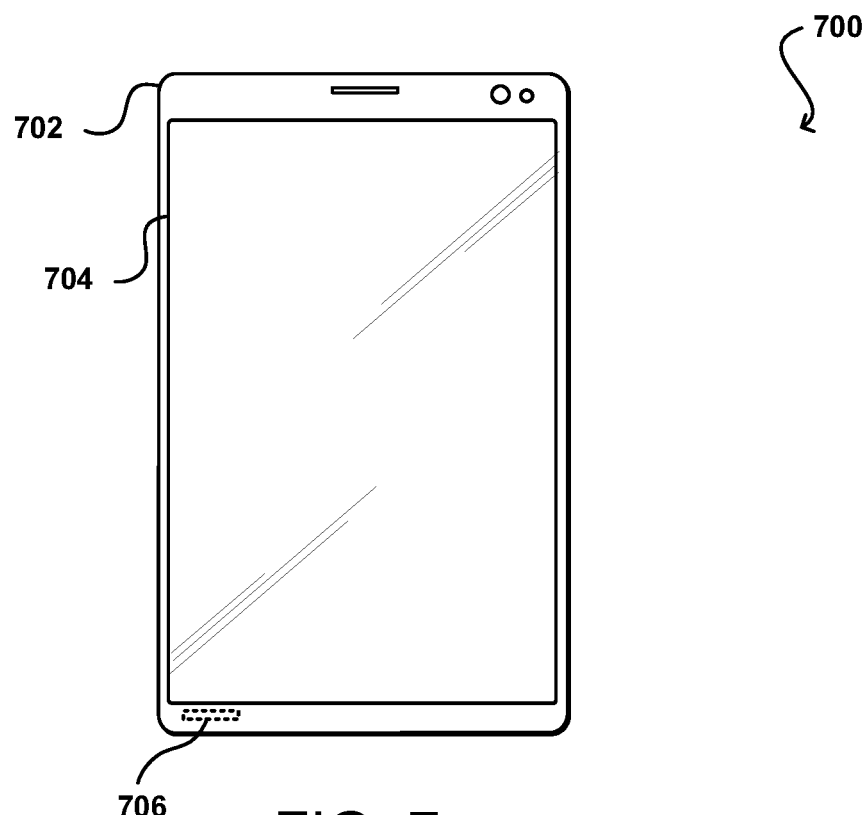
FIG. 7 illustrates an example computing device that can be utilized to submit trip requests and receive route options in accordance with various embodiments.

FIG. 7 illustrates an example computing device 700 that can be used in accordance with various embodiments. Although a portable computing device (e.g., a smart phone or tablet computer) is shown, it should be understood that any device capable of receiving, processing, and/or conveying electronic data can be used in accordance with various embodiments discussed herein. The devices can include, for example, desktop computers, notebook computers, smart devices, Internet of things (IoT) devices, video gaming consoles or controllers, wearable computers (e.g., smart watches, glasses, or contacts), television set top boxes, and portable media players, among others. In this example, the computing device 700 has an outer casing 702 covering the various internal components, and a display screen 704 such as a touch screen capable of receiving user input during operation of the device. These can be additional display or output components as well, and not all computing devices will include display screens as known in the art. The device can include one or more networking or communication components 706, such as may include at least one communications subsystem for supporting technologies such as cellular communications, Wi-Fi communications, BLUETOOTH® communications, and so on. There may also be wired ports or connections for connecting via a land line or other physical networking or communications component.

Figure 8:
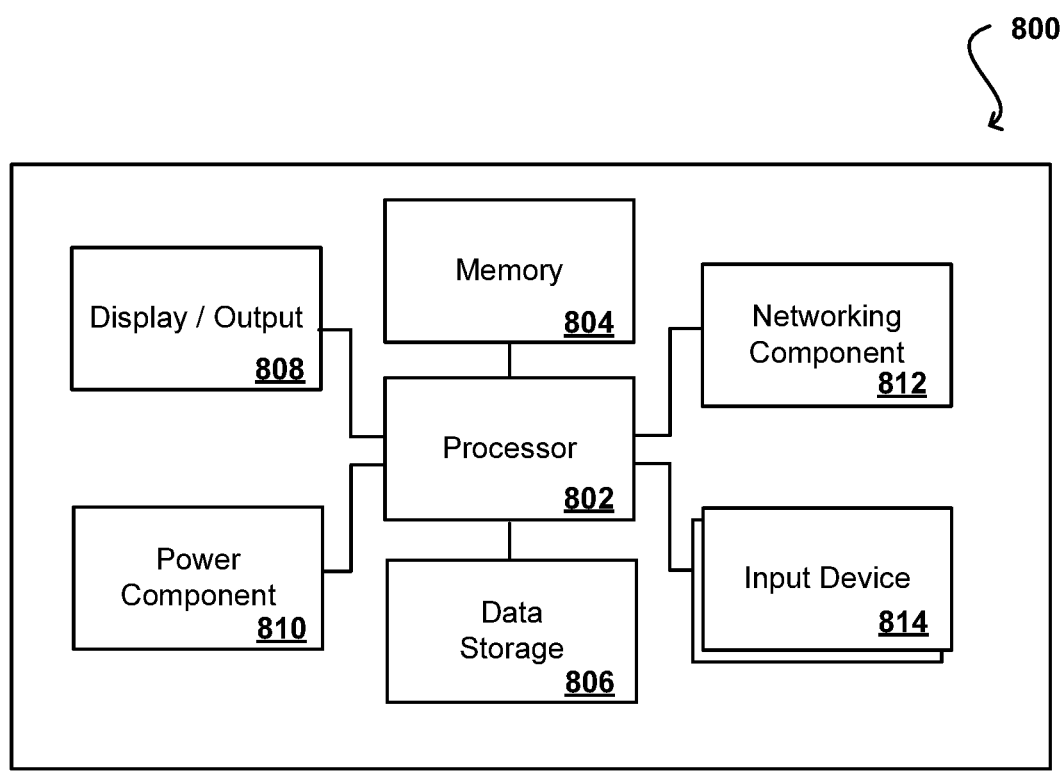
FIG. 8 illustrates example components of a computing device that can be utilized to implement aspects of the various embodiments.

FIG. 8 illustrates an example set of components that can comprise a computing device 800 such as the device described with respect to FIG. 12, as well as computing devices for other purposes such as application servers and data servers. The illustrated example device includes at least one main processor 802 for executing instructions stored in physical memory 804 on the device, such as dynamic random-access memory (DRAM) or flash memory, among other such options. As would be apparent to one of ordinary skill in the art, the device can include many types of memory, data storage, or computer-readable media as well, such as a hard drive or solid state memory functioning as data storage 806 for the device. Application instructions for execution by the at least one processor 802 can be stored by the data storage 806 then loaded into memory 804 as needed for operation of the device 800. The processor can also have internal memory in some embodiments for temporarily storing data and instructions for processing. The device can also support removable memory useful for sharing information with other devices. The device will also include one or more power components 810 for powering the device. The power components can include, for example, a battery compartment for powering the device using a rechargeable battery, an internal power supply, or a port for receiving external power, among other such options.

The computing device may include, or be in communication with, at least one type of display element 808, such as a touch screen, organic light emitting diode (OLED), or liquid crystal display (LCD). Some devices may include multiple display elements, as may also include LEDs, projectors, and the like. The device can include at least one communication or networking component 812, as may enable transmission and receipt of various types of data or other electronic communications. The communications may occur over any appropriate type of network, such as the Internet, an intranet, a local area network (LAN), a 5G or other cellular network, or a Wi-Fi network, or can utilize transmission protocols such as BLUETOOTH® or NFC, among others. The device can include at least one additional input device 814 capable of receiving input from a user or other source. This input device can include, for example, a button, dial, slider, touch pad, wheel, joystick, keyboard, mouse, trackball, camera, microphone, keypad, or other such device or component. Various devices can also be connected by wireless or other such links as well in some embodiments. In some embodiments, a device might be controlled through a combination of visual and audio commands, or gestures, such that a user can control the device without having to be in contact with the device or a physical input mechanism.

Much of the functionality utilized with various embodiments will be operated in a computing environment that may be operated by, or on behalf of, a service provider or entity, such as a rideshare provider or other such enterprise. There may be dedicated computing resources, or resources allocated as part of a multi-tenant or cloud environment. The resources can utilize any of a number of operating systems and applications, and can include a number of workstations or servers Various embodiments utilize at least one conventional network for supporting communications using any of a variety of commercially-available protocols, such as TCP/IP or FTP, among others. As mentioned, example networks include for example, a local area network, a wide-area network, a virtual private network, the Internet, an intranet, and various combinations thereof. The servers used to host an offering such as a ridesharing service can be configured to execute programs or scripts in response requests from user devices, such as by executing one or more applications that may be implemented as one or more scripts or programs written in any appropriate programming language. The server(s) may also include one or more database servers for serving data requests and performing other such operations. The environment can also include any of a variety of data stores and other memory and storage media as discussed above. Where a system includes computerized devices, each such device can include hardware elements that may be electrically coupled via a bus or other such mechanism. Example elements include, as discussed previously, at least one central processing unit (CPU), and one or more storage devices, such as disk drives, optical storage devices and solid-state storage devices such as random access memory (RAM) or read-only memory (ROM), as well as removable media devices, memory cards, flash cards, etc. Such devices can also include or utilize one or more computer-readable storage media for storing instructions executable by at least one processor of the devices. An example device may also include a number of software applications, modules, services, or other elements located in memory, including an operating system and various application programs. It should be appreciated that alternate embodiments may have numerous variations from that described above.

Various types of non-transitory computer-readable storage media can be used for various purposes as discussed and suggested herein. This includes, for example, storing instructions or code that can be executed by at least one processor for causing the system to perform various operations. The media can correspond to any of various types of media, including volatile and non-volatile memory that may be removable in some implementations. The media can store various computer readable instructions, data structures, program modules, and other data or content. Types of media include, for example, RAM, DRAM, ROM, EEPROM, flash memory, solid state memory, and other memory technology. Other types of storage media can be used as well, as may include optical (e.g., Blu-ray or digital versatile disk (DVD)) storage or magnetic storage (e.g., hard drives or magnetic tape), among other such options. Based on the disclosure and teachings provided herein, a person of ordinary skill in the art will appreciate other ways and/or methods to implement the various embodiments.

The specification and drawings are to be regarded in an illustrative sense, rather than a restrictive sense. It will, however, be evident that various modifications and changes may be made thereunto without departing from the broader spirit and scope of the various embodiments as set forth in the claims.

What is claimed is:

1. A computer-implemented method, comprising:
receiving, from a rider computing device, a ride request including an origin and a destination;
determining a set of potential routes to serve the ride request;
analyzing the set of potential routes using an objective routing function including a weighted combination of a set of quality metrics to generate respective quality scores for the potential routes, the objective routing function including at least one rider convenience parameter and at least one operational efficiency parameter;
processing at least a subset of the potential routes using an optimization process to improve at least a subset of the respective quality scores;
determining, by a route determination system, a route in response to a ride request, the route and predicted time to the origin based at least in part on historical route data for a plurality of previously-requested routes and the respective quality scores, each previously-requested route associated with a respective origin, a respective destination, and a respective time period;
identifying an assigned vehicle to the route in response to the ride request;
determining, by the route determination system, a predicted time of arrival for the assigned vehicle to reach the origin;
obtaining information for points of interest (POIs) within a distal range of the origin;
determining promotions for the POIs based at least in part on the predicted time of arrival; and
transmitting, to the rider computing device, computer-readable instructions regarding the promotions for the POIs for display on the rider computing device; and
updating the weightings of the quality metrics for the objective function based on output of a machine learning model trained using historical and recent route performance data.

2. The computer-implemented method of claim 1, further comprising:
determining a type of rider for the ride request based at least historical rider data; and
generating the promotions for the POIs based at least in part on the type of rider or previously provided promotions to the rider.

3. The computer-implemented method of claim 2, wherein the previously provided promotions to the rider include previously redeemed promotions and previously rejected promotions.

4. The computer-implemented method of claim 1, further comprising:
predicting a delay in the route to the predicted time of arrival to the origin;
calculating an estimated time to complete each promotion; and
selecting the promotions to transmit to the rider computing device based on whether the estimated time to complete the promotion is within a time period of the delay.

5. The computer-implemented method of claim 1, further comprising:

determining the route with an alternate origin having an alternate time to origin that is shorter than the predicted time to origin;

determining promotions for alternate POIs within the distal range of the alternate origin;

sending computer-readable instructions to the rider computing device to display a selectable menu for the promotions in exchange for the rider to accept the alternate origin;

receiving a selected promotion in response to the selectable menu; and sending computer-readable instructions to the assigned vehicle to route the assigned vehicle to the alternate origin.

6. The computer-implemented method of claim 1, further comprising:

calculating a quality score for the route;

determining whether the quality score does not meet a quality score threshold; and determining an alternate origin with an alternate quality score that meets the quality score threshold.

7. The computer-implemented method of claim 1, wherein determining the promotions further comprises:

calculating a rider convenience score for the origin or an alternate origin;

determining whether the rider convenience score does not meet a rider convenience score threshold; and determining the promotions based at least in part on the rider convenience score of the origin or alternate origin.

8. The computer-implemented method of claim 1, further comprising:

calculating an estimated time to complete each promotion; and selecting the promotions to transmit to the rider computing device based on whether the estimated time to complete the promotion is within the predicted time of arrival.

9. A computer-implemented method, comprising:

receiving trip requests from one or more computing device corresponding to a future period of time for a geographical area, each trip request including at least an origination location and a destination location;

determining available vehicles to service the trip requests in the geographical area in the future period of time;

determining a set of routing solutions based at least in part on the available vehicles and the trip requests;

generating a respective quality score for each routing solution in the set of routing solutions using an objective function including a weighted combination of quality metrics;

identifying an alternate routing solution with an alternate origination location based at least in part on the alternate route having a respective quality score higher than the respective quality scores of each routing solution in the set of routing solutions;

analyze mapping information to determine POIs within a proximity of the alternate origination location;

determining promotions for the POIs based at least in part on the predicted time of arrival;

transmitting, to the rider computing device, computer-readable instructions regarding the promotions for the POIs for display on the rider computing device;

receiving a response from the rider computing device accepting at least one of the promotions; and identifying an assigned vehicle from the available vehicles to complete the alternate route and travel to the alternate origination location; and updating the weightings of the quality metrics for the objective function based on output of a machine learning model trained using historical and recent route performance data.

10. The computer-implemented method of claim 9, further comprising:

receiving a response from the ride computer device rejecting the promotions; and performing at least one of the following:

identifying a selected routing solution from the set of routing solutions based at least in part on the respective quality score and an assigned vehicle from the available vehicles to perform the selected routing solution;

determining a second set of routing solutions based at least in part on the available vehicles and the trip requests;

identifying a second alternate route having a second origination location with a second alternate quality score satisfying a minimum quality score threshold; and analyzing the mapping information to determine alternate POIs and alternate promotions to provide to the rider computing device for display.

11. The computer-implemented method of claim 10, wherein the trip requests include at least one of: account information associated with an account of the rider computing device, passenger capacity, cargo capacity, type of vehicle, estimated time of arrival, or estimated time to complete the trip requests.

12. The computer-implemented method of claim 11, wherein the promotions or alternate promotions are determined based at least in part upon historical information associated with the account of the rider computer device, the account information, proximity of the POIs to the origination location or the alternate origination location, an estimated time of arrival for the assigned vehicle to reach the origination location or the alternate origination location.

13. The computer-implemented method of claim 9, wherein the objective routing function including at least one rider convenience parameter and at least one operational efficiency parameter, wherein determining the set of routes further comprises:

processing at least a subset of the potential routing solutions using an optimization process to improve at least a subset of the respective quality scores, the optimization process including one or more alternate origination locations within a proximity of the origination location; and determining the alternate routing solution, from the set of potential routing solution, based at least in part upon the respective quality scores.

14. A system, comprising:

at least one processor; and memory including instructions that, when executed by the at least one processor, cause the system to:

receive, from a rider computing device, a ride request including an origin and a destination;

determine a set of potential routes to serve the ride request;

analyze the set of potential routes using an objective routing function including a weighted combination of a set of quality metrics to generate respective quality scores for the potential routes, the objective routing function including at least one rider convenience parameter and at least one operational efficiency parameter;

process at least a subset of the potential routes using an optimization process to improve at least a subset of the respective quality scores;

determine, by a route determination system, a route in response to a ride request, the route and predicted time to the origin based at least in part on historical route data for a plurality of previously-requested routes and the respective quality scores, each previously-requested route associated with a respective origin, a respective destination, and a respective time period;

identify an assigned vehicle to the route in response to the ride request;

determine, by the route determination system, a predicted time for the assigned vehicle to reach the origin;

obtain information for points of interest (POIs) within a distal range of the origin;

determine promotions for the POIs based at least in part on the predicted time to the origin; and send, to the rider computing device, computer-readable instructions regarding the promotions for the POIs; and update the weightings of the quality metrics for the objective function based on output of a machine learning model trained using historical and recent route performance data.

15. The system of claim 14, wherein the instructions when executed further cause the system to:

determine a type of rider for the ride request based at least historical rider data; and generate the promotions for the POIs based at least in part on the type of rider or at least one of previously accepted or previously rejected promotions to the rider.

16. The system of claim 14, wherein the instructions when executed further cause the system to:

predict a delay in the route to the predicted time to the origin;

calculate an estimated time to complete each promotion; and select the promotions based on the estimated time to complete the promotion within a time period of the delay.

17. The system of claim 14, wherein the instructions when executed further cause the system to:

determine the route with an alternate origin having an alternate time to origin that is shorter than the predicted time to origin;

determine promotions for alternate POIs within the distal range of the alternate origin;

send computer-readable instructions to the rider computing device to display a selectable menu for the promotions in exchange for the rider to accept the alternate origin;

receive a selected promotion in response to the selectable menu; and send computer-readable instructions to the assigned vehicle to route the assigned vehicle to the alternate origin.

18. The system of claim 14, wherein the instructions when executed further cause the system to:

calculate a rider convenience score for the origin or an alternate origin;

determine whether the rider convenience score does not meet a rider convenience score threshold; and determine the promotions based at least in part on the rider convenience score of the origin or alternate origin.

* * * * *